May 27, 1924.
F. J. BAST
1,495,239
SPEED CHANGE MECHANISM
Filed Jan. 23, 1923
2 Sheets-Sheet 1
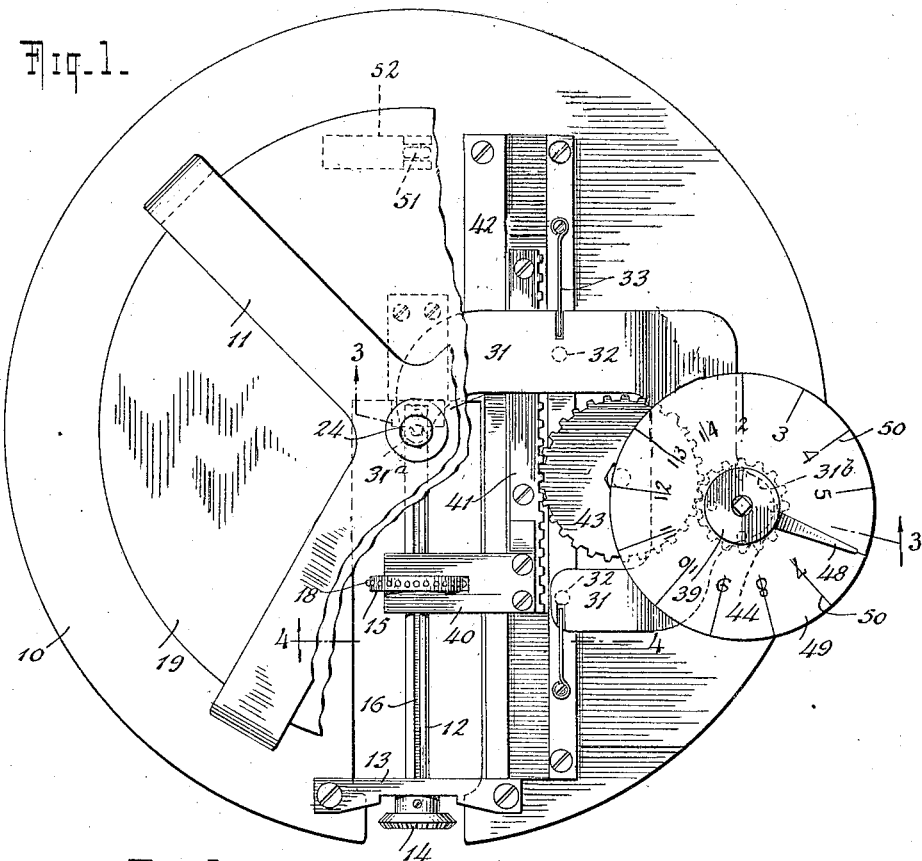
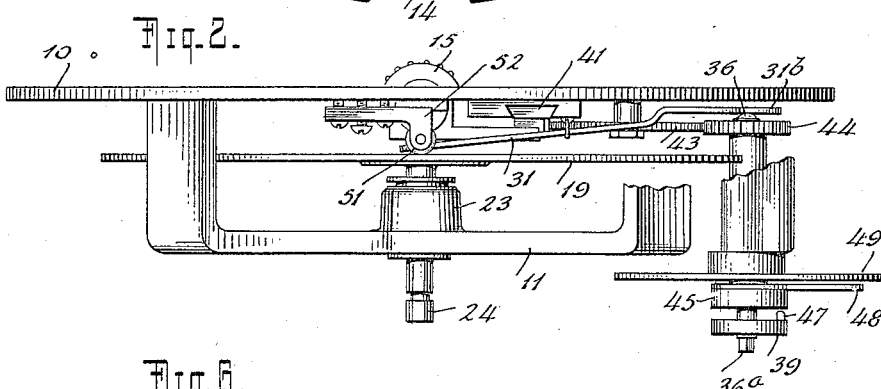
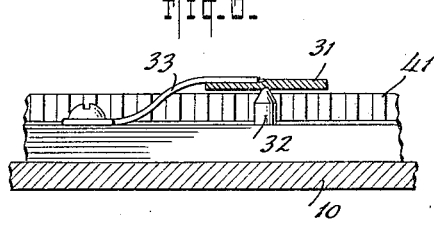
INVENTOR
FRANK J. BAST
BY
ATTORNEYS May 27, 1924.  
F. J. BAST  
1,495,239  
SPEED CHANGE MECHANISM  
Filed Jan. 23, 1923　2 Sheets-Sheet 2
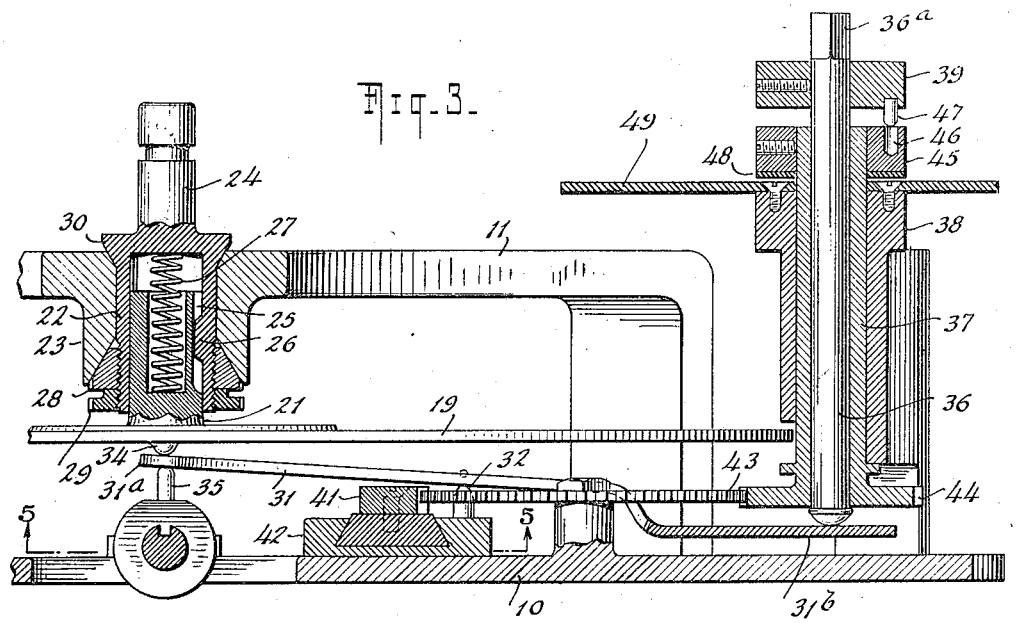
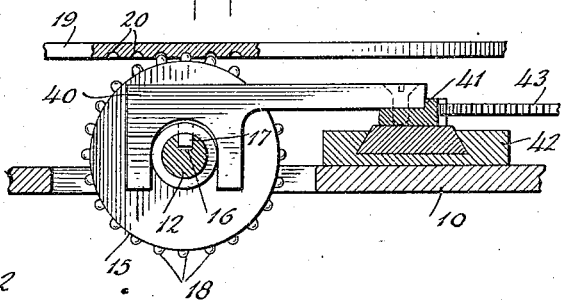
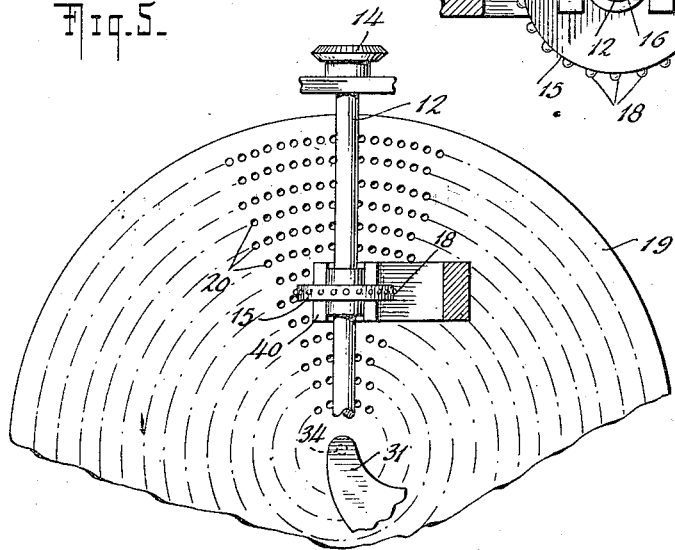
INVENTOR  
FRANK J. BAST  
BY  
*Bresen Behrent*  
ATTORNEYS Patented May 27, 1924.

1,495,239

UNITED STATES PATENT OFFICE.

FRANK J. BAST, OF BROOKLYN, NEW YORK, ASSIGNOR TO CHAS. J. TAGLIABUE MFG. CO., OF BROOKLYN, NEW YORK, A CORPORATION OF NEW YORK.

SPEED-CHANGE MECHANISM.

Application filed January 23, 1923. Serial No. 614,346.

*To all whom it may concern:*

Be it known that I, FRANK J. BAST, a citizen of the United States, and resident of the borough of Brooklyn, county of Kings, city and State of New York, have invented certain new and useful Improvements in Speed-Change Mechanisms, of which the following is a specification.

My invention relates to speed change mechanisms and more particularly to mechanisms of this type adapted especially for producing variable speeds in automatic controller cams or recorder charts such as are commonly found in automatic controlling and recording instruments and has for its object to provide a novel and simple mechanism of this character in which a great variety of speed changes are possible without the necessity for a multiplicity of gears of different diameters. Other more specific objects of the invention will appear from the description hereinafter.

In the accompanying drawings which illustrate an example of the invention without defining its limits Fig. 1 is a face view of the mechanism with parts broken away; Fig. 2 is a side elevation thereof; Fig. 3 is a fragmentary section on the line 3—3 of Fig. 1; Fig. 4 is a similar view on the line 4—4 of Fig. 1; Fig. 5 is a detail section on the line 5—5 of Fig. 3 and Fig. 6 is a detail sectional view illustrating the mounting of a rocker which forms part of the mechanism.

As shown in the illustrated example the mechanism comprises a base plate 10 upon which a frame in the form of a spider 11 is secured as shown in Figs. 1 and 2. A driving shaft 12 is journalled in suitable bearings 13 upon the base 10 and carries at one end a bevel gear 14 adapted for connection with a source of motive power which may comprise, for instance, a clockwork or other suitable mechanism. A driving member in the form of a wheel 15 is mounted upon the shaft 12 and is slidable lengthwise thereof; in order that said wheel 15 may positively rotate with the driving shaft 12 and yet is slidable lengthwise thereof, the latter is provided with a keyway 16 into which a key 17 of the wheel 15 is fitted. Upon its periphery the wheel 15 is provided with a plurality of projections or pins 18. the purpose of which will be more fully explained hereinafter. The driven element comprises a disk 19 located contiguous to the wheel 15 and rotatable about an axis at right angles to the axis of the wheel 15; upon that face which lies adjacent to the wheel 15 the disk 19 is provided with devices arranged in a plurality of series spaced apart in radial directions and shown in the illustrated example in the form of recesses 20 of such dimensions as to accommodate the pins 18 of the wheel 15. The recesses 20 are concentrically arranged upon said disk 19 about the axis thereof and at spaced intervals in the direction of the radii of said disk so that each series of recesses 20 constitutes a definite rotative speed factor whereby the rotative speed of said disk is subject to variation. In the normal position of the parts the projections or pins 18 of the wheel 15 are located in registry with and fit into the recesses 20 of any given series as shown in Fig. 4 and serve to effect a positive driving engagement between said disk 19 and the wheel 15 whereby lost motion or slippage is obviated.

Because of the engagement of the projections or pins 18 with the recesses 20, it is necessary to disengage the same when it is desired to shift the wheel 15 lengthwise of the shaft 12 for the purpose of changing the speed at which the disk 19 is driven. For this reason, in the illustrated example, the disk 19 is mounted in such a way as to be movable away from the wheel 15 to an extent sufficient to disengage the projections or pins 18 from the recesses 20; that is to say, the disk is provided with a hollow shaft 21 which is slidably mounted in a bushing 22 which itself is rotatably mounted in a boss 23 forming part of the spider 11. A spindle 24 projects axially outward from the bushing 22 and is representative of the element whereby the device to which driving power is transmitted by the mechanism is connected therewith. For the purpose of connecting the shaft 21 and bushing 22 so as to cause co-incident rotation thereof without interfering with the sliding motions of said shaft, the latter may be provided with a slot or keyway 25 adapted to receive a lug or key 26 of the bushing 22. A coil spring 27 bears with one end against the bushing 22 and with its other end against an inner wall of the shaft 21 or against the disk 19 and exerts a tension tending to press the disk 19 toward the wheel 15. The bushing 22 may be secured in the boss 23 in any conventional manner as, for instance, by means of a bearing cone 28 and a locknut 29 both of which are screwed upon said bushing at one end thereof; to increase the efficiency of the device the bushing may be provided at its other end with an integral cone-shaped bearing surface 30 adapted to fit a corresponding surface of the spider 11.

In the illustrated example the means whereby the disk 19 is adjusted away from the wheel 15 comprises a rocker 31 provided with depressions which fit upon pivot pins 32 as shown in Fig. 6 whereby said rocker is pivotally mounted upon the base 10.

Springs 33 secured to the base 10 or to an element mounted thereon project over said rocker at points in registry with the pivot pins 32 and serve to maintain said rocker 31 in position thereon. The free end 31ᵃ bears against a lug or projection 34 projecting from the face of the disk 19, a stop pin 35 being located upon the opposite side of said rocker at the end 31ᵃ to arrest its movement in one direction as will appear more fully further on in the description. The rocker is further provided with an extension 31ᵇ located in registry with a plunger 36 slidable within a hollow shaft 37 which itself is rotatably mounted in a bearing bracket 38 fixed upon the base 10 at the proper point; the purpose of the shaft 37 will be pointed out hereinafter. A collar 39 is fixed upon the free end of the plunger 36, the latter preferably being provided at said free end with a squared end 36ᵃ for the reception of a suitable key or implement.

Any suitable mechanism may be provided for shifting the wheel 15 lengthwise of the shaft 12 when a change of rotative speed is desired in the disk 19; for instance, the mechanism shown in the illustrated example may be provided for this purpose. This mechanism comprises a fork 40 which embraces the wheel 15 upon opposite sides of the shaft 12 and which is carried by a rack 41 slidably mounted in a guide plate 42 secured upon the base plate 10 as shown in Figs. 1, 3 and 4. The rack 41 meshes with a gear 43 rotatably mounted upon said base plate 10 which gear, in turn, meshes with a pinion 44 fixed upon the hollow shaft 37 previously referred to. At its free end this shaft 37 carries a collar 45 located in registry with and slightly spaced from the collar 39 of the plunger 36 when the parts are in the normal position illustrated in Fig. 3. For the purpose which will be more fully set forth further on in the description, the collars 39 and 45 are provided with cooperating means whereby they may be coupled together at will; in the illustrated example this means comprises a plurality of recesses 46 and a pin 47, the recesses being located upon the collar 45 while the pin 47 is located upon the collar 39, it being understood that the location of the recesses and pin with respect to said collars may be reversed if desired. In order that an accurate adjustment of the wheel 15 with respect to the disk 19 may be secured with a minimum of effort and for the further purpose of visibly indicating such adjustment, the collar 45 may be provided with a pointer or its equivalent 48 arranged to move over the face of a dial 49 which is provided with designations 50 whereby the setting of the mechanism and the position of the wheel 15 are accurately indicated; that is to say, when the pointer 48 or its equivalent is in registry with any one of the designations 50, the projections or pins 18 of the wheel 15 will be in accurate registry with one of the series of recesses 20 of the disk 19.

For the purpose of maintaining the disk 19 against tilting during operation of the mechanism, a roller 51 may be provided as shown in Fig. 2; this roller is journalled in a bearing 52 upon the base plate 10 and serves as a roller-bearing for said disk 19 as will clearly appear from the illustration in Fig. 2.

In practice power is applied in any convenient manner as previously set forth to the pinion 14 which serves to rotate the shaft 12 in its bearings and to rotatably actuate the wheel 15. Because of the engagement of the projections or pins 18 of the latter with one series of the recesses 20, this will cause a rotation of the disk 19 at a predetermined speed which depends upon the location of that series of recesses 20 with which the pins 18 happen to be engaged. The rotation of the disk 19 in the described manner in turn causes a corresponding operation of the shaft 21, bushing 22 and consequently of the spindle 24 and such element as may be coupled or connected with the latter. During the described operation the disk 19 is pressed toward the wheel 15 by the spring 27 so that the pins 18 are maintained in secure engagement with the recesses 20 of one of the series of such recesses which are located upon said disks 19. When it is desired to drive the spindle 24 and the element with which it is connected at a different speed, the collar 39 is first rotated to bring its projection 47 into registry with one of the recesses 46 after which a pressure is exerted on said collar 39 to shift it toward the collar 45 and thereby to correspondingly move the plunger 36 in the hollow shaft 37. In this way the plunger 36 is caused to exert a pressure upon the extension 31ᵇ which pivotally swings the rocker 31 upon the pivots 32 and against the tension of the springs 33 and by reason of the pressure exerted by the end 31ᵃ upon the lug 34 shifts the disk 19 in a direction away from the wheel 15. This movement of the disk is against the tension of the spring 27 and relatively to the bushing 22 and is sufficient to disengage the pins 18 from the recesses 20. By the described inward movement of the collar 39 toward the collar 45 to bring the projection 47 into one of the recesses 46, the two collars 39 and 45 have been connected with each other so that if a rotative force is exerted upon the collar 39, this will cause the collar 45 and with it the hollow shaft 37, to be rotatably actuated. This rotative actuation of said shaft 37 is communicated by means of the pinion 44, to the gear 43 and thereby to the rack 41. The latter is accordingly slidably shifted in the guide plate 42 and causes the wheel 15 to be moved lengthwise of the shaft 12 through the medium of the fork 40. The adjustment of the wheel 15 along said shaft 12 is continued until the pointer 48 or its equivalent registers with that designation 50 of the dial 49 which indicates the speed at which it is desired to drive the spindle 24 and the element connected therewith. When this adjustment is reached pressure is simply removed from the collar 39 to permit the parts to resume their initial positions; that is to say, as soon as the pressure is removed from said collar 39 the springs 33 will swing the rocker 31 in a direction to move its end 31ª away from the lug 34 and into engagement with the stop pin 35 which movement also restores the plunger 36 and collar 39 to their normal positions and thereby disconnects the pin 47 from the recess 46 with which it was previously engaged. At the same time this relieves the disk 19 of a restraining force and permits the spring 27 to shift said disk 19 back toward the wheel 15 and to engage the recesses 20 of the new series with the pins 18 of said wheel 15. As power is now again applied to the bevel gear 14 the disk 19 will be driven at a different speed from that which it was previously driven and will correspondingly actuate the spindle 24 and the element connected therewith.

The device is simple in construction and efficient in operation and does away with the necessity for the multiplicity of gears commonly found in change speed mechanism and at the same time provides a positive driving engagement between the driving member and the driven member and thus avoids the possibility of any lost motion or slippage which might affect the accuracy of the automatic controlling or recording instrument in which the mechanism is embodied. The operation of disconnecting the driven member from the driving member and the adjustment of the driving member to a different driving relation with said driven member is accomplished in a simple manner and without requiring any complicated movements on the part of the operator. The mechanism is useful in many fields and is particularly adapted for producing various revolutionary speeds in the controller cams and recorder charts of automatic controllers and automatic recording instruments.

Various changes in the specific form shown and described may be made within the scope of the claims without departing from the spirit of my invention.

I claim:

1. A speed change mechanism comprising a disk provided upon its one face with a plurality of recesses arranged in series spaced apart in radial directions, a rotatable member adjustable across said one face of said disk for varying the operative speed relation of the disk and member, a plurality of projections on the periphery of said member adapted to co-operate with the recesses of said disk to effect a positive driving engagement between the latter and said member, means for separating said disk and rotatable member to disconnect said projections from said recesses, means for adjusting said rotatable member across said one face of the disk and means whereby said separating means, in the performance of its separating function, is coupled to said adjusting means to provide an actuating device therefor.

2. A speed change mechanism comprising a driven disk provided upon its one face with a plurality of series of recesses spaced apart in radial directions, each of said series constituting a definite rotative speed factor, a driving shaft extending parallel with and contiguous to said one face of said disk, a driving wheel located upon said shaft and slidable lengthwise thereof, a plurality of pins on the periphery of said wheel arranged to engage the recesses of said disk to effect a positive driving connection between the latter and said wheel, a lever whereby said disk and wheel are separated to disengage said pins from said recesses, mechanism for shifting said driving wheel across the face of said driven disk to vary the driven speed thereof, a hollow operating shaft connected with said mechanism, a plunger slidable lengthwise of said operating shaft for operating said lever and means whereby said plunger, in the act of operating said lever is coupled to said hollow shaft to provide an actuating device therefor.

3. A speed change mechanism comprising a driven disk provided upon its one face with a plurality of series of recesses spaced apart in radial directions, each of said series constituting a definite rotative speed factor, a driving shaft extending parallel with and contiguous to said one face of said disk, a driving wheel located upon said shaft and slidable lengthwise thereof, a plurality of pins on the periphery of said wheel arranged to engage the recesses of said disk to effect a positive driving connection between the latter and said wheel, a fork engaging said wheel, a rack carrying said fork, gearing connected with said rack, means for shifting said disk away from said wheel to disengage its pins from said recesses and means for operating said gearing to adjust said wheel across the face of said disk to vary the driven speed thereof.

4. A speed change mechanism comprising a driven disk provided upon its one face with a plurality of series of recesses spaced apart in radial directions, each of said series constituting a definite rotative speed factor, a driving shaft extending parallel with and contiguous to said one face of said disk, a driving wheel located upon said shaft and slidable lengthwise thereof, a plurality of pins on the periphery of said wheel arranged to engage the recesses of said disk to effect a positive driving connection between the latter and said wheel, a fork engaging said wheel, a rack carrying said fork, gearing connected with said rack, a hollow shaft connected with said gearing, a lever for shifting said disk away from said wheel to disengage its pins from said recesses, a plunger slidably mounted in said hollow shaft for operating said lever and co-operating means on said hollow shaft and plunger for coupling the two together after said plunger has operated said lever whereby said wheel is adjusted across the face of said disk to vary the driven speed thereof.

5. A speed change mechanism comprising a driven disk provided upon its one face with a plurality of series of recesses spaced apart in radial directions, each of said series constituting a definite rotative speed factor, a driving shaft extending parallel with and contiguous to said one face of said disk, a driving wheel located upon said shaft and slidable lengthwise thereof, a plurality of pins on the periphery of said wheel arranged to engage the recesses of said disk to effect a positive driving connection between the latter and said wheel, a fork engaging said wheel, a rack carrying said fork, gearing connected with said rack, means for shifting said disk away from said wheel to disengage its pins from said recesses, means for operating said gearing to adjust said wheel across the face of said disk to vary the driven speed thereof and means for indicating the adjustment of said wheel relatively to said disk.

In testimony whereof I have hereunto set my hand.

FRANK J. BAST.